(12) United States Patent
Abdoli et al.

(10) Patent No.: US 9,172,577 B2
(45) Date of Patent: Oct. 27, 2015

(54) SYSTEM AND METHOD FOR ORTHOGONAL FREQUENCY DIVISION MULTIPLEXING-OFFSET QUADRATURE AMPLITUDE MODULATION

(71) Applicant: FutureWei Technologies, Inc., Plano, TX (US)

(72) Inventors: Mohammad-Javad Abdoli, Kanata (CA); Ming Jia, Ottawa (CA); Jianglei Ma, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 24 days.

(21) Appl. No.: 14/035,161

(22) Filed: Sep. 24, 2013

(65) Prior Publication Data

US 2014/0233664 A1    Aug. 21, 2014

Related U.S. Application Data

(60) Provisional application No. 61/766,426, filed on Feb. 19, 2013.

(51) Int. Cl.
*H04L 5/12* (2006.01)
*H04L 23/02* (2006.01)
*H04L 27/26* (2006.01)

(52) U.S. Cl.
CPC .................................. *H04L 27/2698* (2013.01)

(58) Field of Classification Search
CPC ..... H04L 27/2647; H04L 27/38; H04L 27/34; H04L 5/0007; H04L 27/3488; H04L 27/2698
USPC .................................................. 375/260, 261
See application file for complete search history.

(56) References Cited

U.S. PATENT DOCUMENTS

| | | | |
|---|---|---|---|
| 6,320,901 B1 | 11/2001 | Arad et al. | |
| 7,103,623 B2 * | 9/2006 | Egelmeers et al. | 708/322 |
| 7,529,229 B1 * | 5/2009 | Norrell et al. | 370/352 |
| 2009/0122884 A1 | 5/2009 | Vook et al. | |
| 2012/0051406 A1 | 3/2012 | Jarosinski | |
| 2014/0233437 A1 * | 8/2014 | Abdoli et al. | 370/280 |

FOREIGN PATENT DOCUMENTS

| | | |
|---|---|---|
| CN | 101068232 A | 11/2007 |
| KR | 20080112578 A | 12/2008 |
| WO | 2009043200 A1 | 4/2009 |

OTHER PUBLICATIONS

Bellanger, M. et al., "FBMC physical layer: a primer," PHYDYAS, 31 pages, Jun. 2010.

(Continued)

*Primary Examiner* — Ted Wang
(74) *Attorney, Agent, or Firm* — Slater & Matsil, L.L.P.

(57) ABSTRACT

A method for performing orthogonal frequency division multiplexing (OFDM)/offset quantization amplitude modulation (OQAM) includes obtaining a data burst. The method includes performing weighted circularly convolved filtering modulation on the data burst to produce an output signal. The method further includes a first wireless device transmitting the output signal to a second wireless device. The second wireless device receives an input signal from the first wireless device, and the second wireless devices performs weighted circularly convolved demodulation filtering on the input signal to produce the data burst.

23 Claims, 14 Drawing Sheets

(56) References Cited

OTHER PUBLICATIONS

Vahlin, Anders et al., "Optimal Finite Duration Pulses for OFDM," IEEE Transactions on Communications, vol. 44, No. 1, Jan. 1996, 5 pages.

Le Floch, Bernard et al., "Coded Orthogonal Frequency Division Multiplex," Proceedings of the IEEE, vol. 83, No. 6, Jun. 1995, 15 pages.

Siohan, Pierre et al., "Analysis and Design of OFDM/OQAM Systems Based on Filterbank Theory," IEEE Transactions on Signal Processing, vol. 50, No. 5, May 2002, 14 pages.

Bellanger, Maurice "Efficiency of filter bank multicarrier techniques in burst radio transmission," IEEE Globecom 2010 proceedings, Dec. 6-10, 2010, 4 pages.

International Search Report for Application No. PCT/CN2014/072255 mailed May 21, 2014, 12 pages.

* cited by examiner

SYSTEM AND METHOD FOR ORTHOGONAL FREQUENCY DIVISION MULTIPLEXING-OFFSET QUADRATURE AMPLITUDE MODULATION

This application claims the benefit of U.S. Provisional Application Ser. No. 61/766,426 filed on Feb. 19, 2013, and entitled "System and Method for Weighted Circularly Convolved Filtering in OFDM-OQAM," which application is hereby incorporated herein by reference.

TECHNICAL FIELD

The present invention relates to a system and method for wireless communications, and, in particular, to a system and method for orthogonal frequency division multiplexing (OFDM)/offset quadrature amplitude modulation (OQAM).

BACKGROUND

In wireless communications, orthogonal frequency division multiplexing (OFDM) may be used as a waveform structure. OFDM has many advantages, including the ease of implementation using fast Fourier transform (FFT) and inverse FFT (IFFT) and robustness against multi-path fading. However, OFDM has drawbacks, such as spectral inefficiency from cyclic-prefix (CP) and frequency guard bands.

OFDM-offset quadrature amplitude modulation (OQAM) is a multi-carrier transmission technique which uses time-frequency localized orthogonal prototype filters, such as root-raised cosine (RRC) and isotropic orthogonal transform algorithm (IOTA) pulse shapes. OFDM/OQAM has a superior power spectral density (PSD) side-lobe decay compared to OFDM. Hence, OFDM/OQAM may reduce the guard band overhead compared to OFDM. For example, in a long term evolution (LTE) system, the overhead may be reduced by 10%, in addition to the gain in spectral efficiency from CP removal. However, OFDM/OQAM incurs an overhead from transmission times of tails at both ends of a transmission burst. OFDM/OQAM has an overhead due to the T/2 time offset between the OQAM symbols, where T is the symbol duration. The total overhead duration is equal to the length of the prototype filter, minus T/2. The length of the prototype filter may be at least 4T to preserve an acceptable inter-symbol interference (ISI) inter-carrier interference (ICI). For a burst length of 28 OQAM symbols, this is 7/28=25% overhead in time.

SUMMARY

An embodiment method for performing orthogonal frequency division multiplexing (OFDM)/offset quantization amplitude modulation (OQAM) includes obtaining a data burst. The method includes performing weighted circularly convolved filtering modulation on the data burst to produce an output signal. The method further includes a first wireless device transmitting the output signal to a second wireless device.

Another embodiment method for performing OFDM/OQAM includes a first wireless device receiving an input signal from a second wireless device. The method further includes performing weighted circularly convolved demodulation filtering on the input signal to produce a data burst.

An embodiment first wireless device includes a processor and a computer readable storage medium storing programming for execution by the processor. The programming including instructions to obtain a data burst, perform weighted circularly convolved filtering modulation on the data burst to produce an output signal, and transmit the output signal to a second wireless device.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Orthogonal frequency division multiplexing (OFDM)/offset quadrature amplitude modulation (OQAM) is a multi-carrier transmission technique that incurs an overhead from transmission times or tails at both ends of a transmission burst. In an example, OFDM/OQAM is expressed as a linear convolution of an input up-sampled OQAM sequence with a bank of frequency-modulated versions of a prototype filter. Linearly convolved filters may be used, which create filtering overhead. In one example, hard truncation is used to reduce the overhead. Hard truncation completely removes the overhead. However, it causes inter-symbol interference (ISI) and inter-carrier interference (ICI) on the OQAM symbols by distorting the pulse shapes of the symbols which are modulated close to the time edges of the signal, making them non-orthogonal. Moreover, the spectral side-lobe decay of the OFDM/OQAM signal is negatively affected by truncation from the sharp transitions at the edges of the signal. Truncation has problems in both spectrum side-lobes and signal error vector magnitude (EVM).

In an embodiment, weighted circularly convolved filtering is used to reduce overhead in OFDM/OQAM. With circularly convolved filtering, a sequence of weighted data blocks is used as the input for OFDM/OQAM modulation. The weights are determined such that the output of the modulator is periodic. This is equivalent to a weighted circular convolution in the modulator and demodulator.

Figure 1:
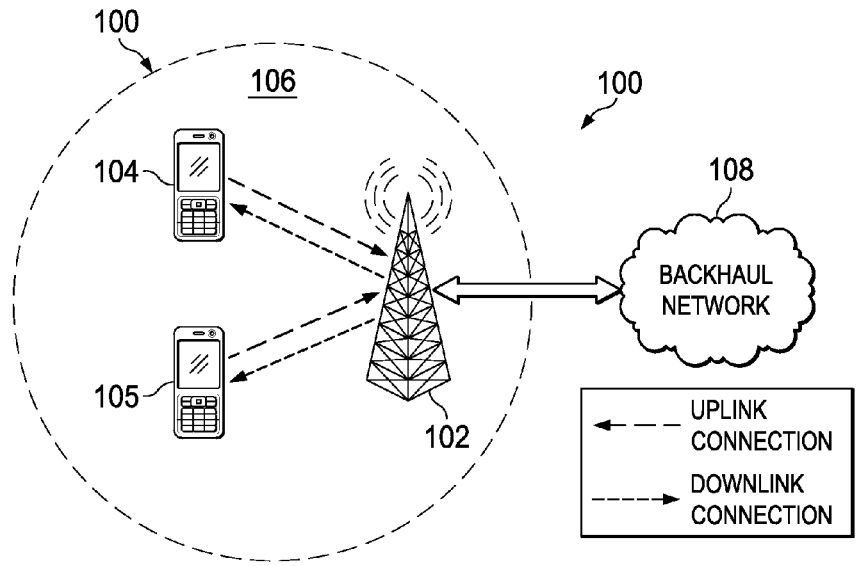
FIG. 1 illustrates a diagram of a wireless network for communicating data.

FIG. 1 illustrates network 100 for communicating data. Network 100 comprises communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end (not shown). In some embodiments, the network 100 may comprise various other wireless devices, such as relays, femtocells, etc.

Figure 2:
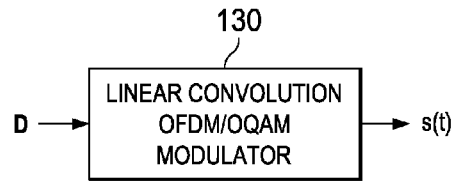
FIG. 2 illustrates an embodiment linear convolution orthogonal frequency division multiplexing (OFDM)/offset quadrature amplitude modulation (OQAM) modulator.

FIG. 2 illustrates a flowchart for a method of linear convolution modulation. An input data burst D is linearly convolved by linear convolution OFDM/OQAM modulator 130 to produce output signal s(t). An example data burst is given by:

$$D = \begin{bmatrix} d_{0,1} & d_{0,2} & \cdots & d_{0,N} \\ d_{1,1} & d_{1,2} & \cdots & d_{1,N} \\ \vdots & \vdots & \ddots & \vdots \\ d_{2M-1,1} & d_{2M-1,2} & \cdots & d_{2M-1,N} \end{bmatrix},$$

where the columns correspond to frequency and the rows correspond to time. In data burst D, there are 2M subcarriers, and N symbols in time.

Figure 3:
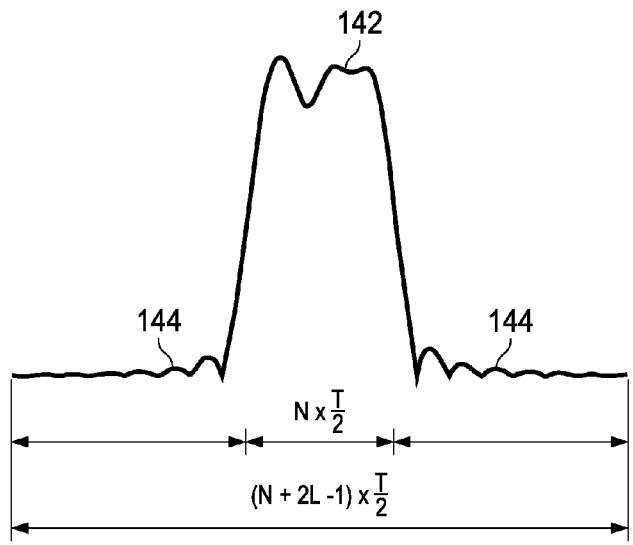
FIG. 3 illustrates a linearly convolved OFDM/OQAM signal.

FIG. 3 illustrates output signal s(t), shown by curve 142, which is exaggerated for illustration purposes. Curve 142 has tails 144 with a length of LT/2 each. The total time of curve 142 is given by:

$$(N + 2L - 1) \times \frac{T}{2}.$$

However, it is desirable for the time of curve 142 to be reduced to:

$$N \times \frac{T}{2}.$$

Figure 4:
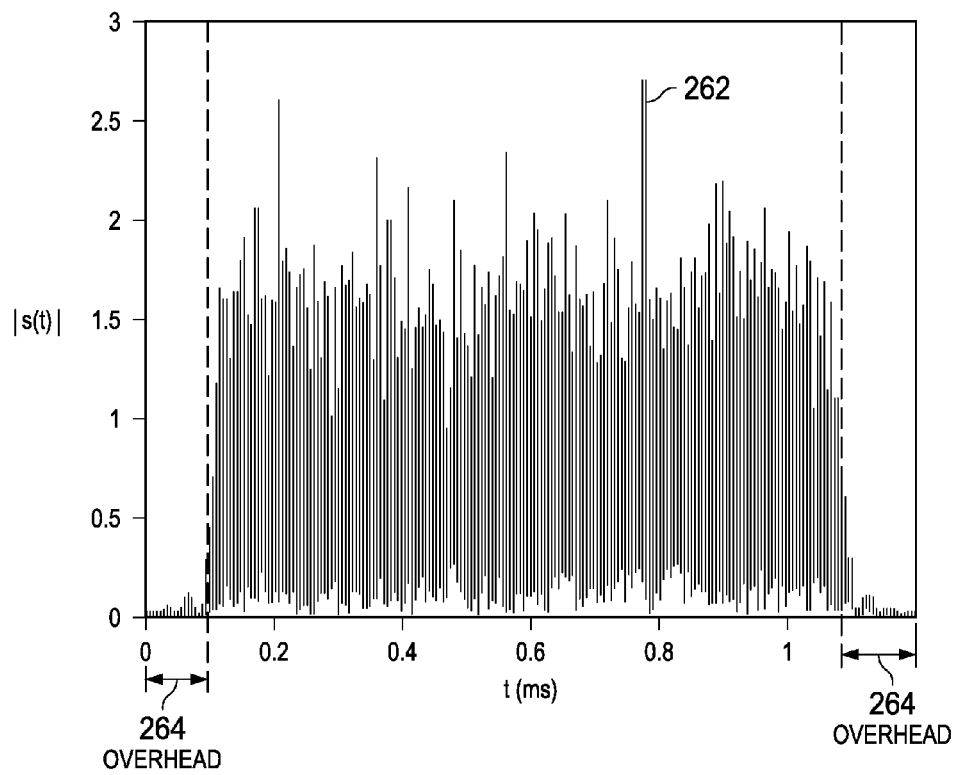
FIG. 4 illustrates another linearly convolved OFDM/OQAM signal.

FIG. 4 illustrates a more realistic graph of another output signal |s(t)| versus time, illustrated by curve 262. Curve 262 contains overhead 264.

In linear convolution modulation, a sequence of OQAM symbols is modulated over a set of real-orthogonal pulse shapes. The pulse shapes are obtained by shifting a symmetrical real-valued prototype filter p(t) in time and frequency. For a continuous time OFDM/OQAM signal, the modulator output may be written as:

$$s(t) = \sum_{n=-\infty}^{+\infty} \sum_{k=0}^{M-1} d_{2k,2n} p(t-nT) e^{\frac{j2\pi(2k)t}{T}} + j \cdot d_{2k,2n+1} p\left(t - \frac{T}{2} - nT\right) e^{\frac{j2\pi(2k)t}{T}} +$$
$$j \cdot d_{2k+1,2n} p(t-nT) e^{\frac{j2\pi(2k+1)t}{T}} + d_{2k+1,2n+1} p\left(t - \frac{T}{2} - nT\right) e^{\frac{j2\pi(2k+1)t}{T}}.$$

The real-valued constellation points are given by $d_{k,n}$. The real valued constellation points may be, for example, pulse-amplitude modulating (PAM) symbols or real or imaginary parts of quadrature amplitude modulation (QAM) symbols. The number of subcarriers is 2M, the subcarrier spacing is 1/T, and the time spacing between two consecutive OQAM symbols is T/2. The real-orthogonality implies that:

$$R\left\{ \int_{-\infty}^{+\infty} p\left(t - \frac{nT}{2}\right) p\left(t - \frac{n'T}{2}\right) \times e^{\frac{j2\pi(m'-m)t}{T}} e^{j2\pi(\varphi_{m',n'} - \varphi_{m,n})} dt \right\} = \delta_{m,m'} \delta_{n,n'},$$

where:

$$\varphi_{m,n} \triangleq \frac{\pi}{2}(m+n).$$

The discrete time formulation of OFDM/OQAM transmission is realized by sampling the continuous-time signal with a sampling period of:

$$T_S = \frac{T}{2M}.$$

That is:

$$s(m) = \sum_{n=-\infty}^{+\infty} \sum_{k=0}^{2M-1} d_{k,n} p(m-nM) e^{\frac{j2\pi km}{2M}} e^{j\varphi_{k,n}}.$$

Figure 5:
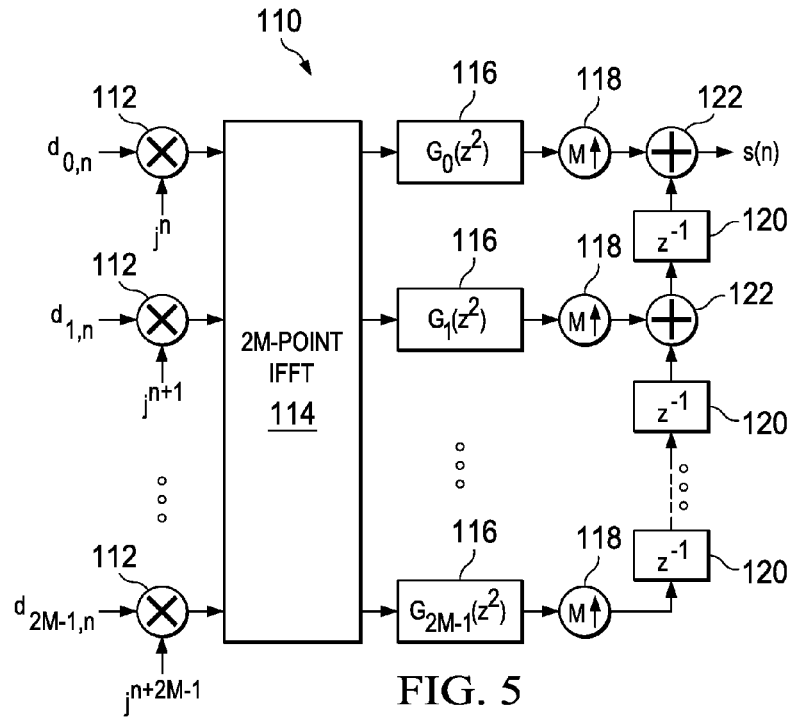
FIG. 5 illustrates an embodiment OFDM/OQAM modulator poly-phase structure.

FIG. 5 illustrates OFDM/OQAM modulator poly-phase structure 110 which may be used to implement OFDM/OQAM modulation. The input data points are $d_{k,n}$, where k represents the subcarrier and n represents the symbol in time. The inputs are multiplied by $j^{n+k}$ in multiplier blocks 112. Then, IFFT block 114, a 2M-point IFFT, performs IFFT. After IFFT block 114, linear convolution filters 116 perform linear convolution using transfer functions $G_k(z^2)$. Expansion blocks 118 expand the outputs of linear convolution filters 116 by a factor M. The outputs of expansion blocks 118 are then time shifted by time shift blocks 120, and added by adders 122 to produce output signal s(n).

Figure 6:
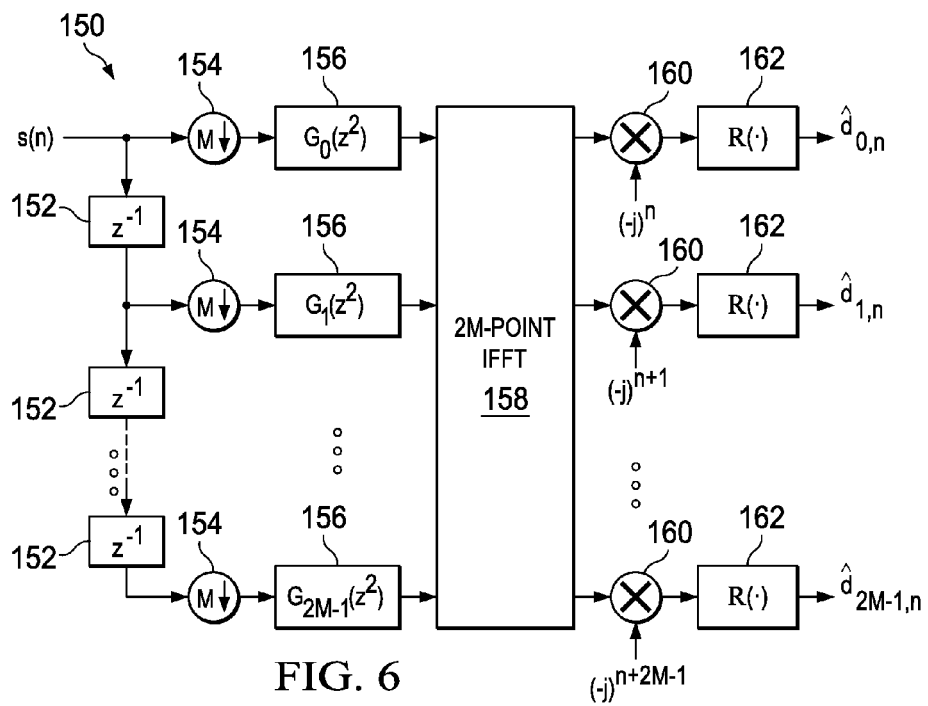
FIG. 6 illustrates an embodiment OFDM/OQAM demodulator poly-phase structure.

FIG. 6 illustrates OFDM/OQAM demodulator poly-phase structure 150. A received signal s(n) is time shifted by time shift blocks 152. The time shifted signals are then decimated by decimator blocks 154. Filter blocks 156 filter the decimated output using filters $G_k(z^2)$. Filter blocks 156 may be a bank of filters, each of which applies a linear convolution to its input signal. Next, a 2M-point IFFT is performed by IFFT block 158 on the filtered signals. The outputs of IFFT block 158 are then multiplied by $(-j)^{n+k}$ in multiplication blocks 160. Finally the real parts are extracted by real extractor blocks 162 to produce the outputs $d_{k,n}$.

Although the OFDM/OQAM signal is expressed as an infinite sequence of OQAM symbols, in reality, the length of the sequence is finite. In fact, delay considerations promote a transmission burst that is not too long. On the other hand, the length of the prototype filter may be at least 4T to satisfy the real-orthogonality condition with an acceptable approximation while having a reasonable spectrum side-lobe performance. Therefore, for a length N burst of OQAM symbols, there may be an overhead ratio in time of:

$$\frac{\left(4T - \frac{T}{2}\right)}{\frac{NT}{2}} = \frac{7}{N}.$$

FIG. 4 shows an OFDM/OQAM signal with a burst of N=28 OQAM symbols with a 25% overhead.

The aggregation of the tails due to linear convolution of each poly-phase filter followed by time shifts results in the overall overhead of the modulated signal s(n). Adding weighted circular convolution may remove the overhead of OFDM/OQAM signals without increasing ICI/ISI. Using traditional circular convolution in the poly-phase filters destroys the real-orthogonality of the OFDM/OQAM signal when the length of the OQAM signal burst is odd. Therefore, traditional circular convolution causes ICI/ISI, especially on the symbols modulated around the edges of the time-domain signal.

An OFDM/OQAM modulator is a linear time-variant system due to the factor-M up-sampling and multiplications by the factor $j^{n+k}$. In fact, if s(n) is the output of the modulator for the input signal:

$$d(n) \triangleq [d_{0,n}, \ldots, d_{2M-1,n}]T,$$

the output of the modulator for the input signal:

$$d(n-n_o)$$

can be shown to be:

$$j^{n_os}(n-n_o M),$$

or, in the continuous time domain:

$$j^{n_o} s\left(t - \frac{n_o T}{2}\right).$$

Assuming that d(n) is a burst of length N of real OQAM signals, that is:

$$d(n)=0, n \in \{0, \ldots, N-1\},$$

and the modulator is fed with a weighted modulo-N circularized version of d(n). That is:

$$d_c(n) \triangleq \Sigma_{i=-\infty}^{+\infty} \alpha_i d(n-iN),$$

where $\alpha_i$ are real valued weights, the output of the modulator is given by:

$$s_c(t) \triangleq \alpha_i j^{iN} s\left(t - \frac{iNT}{2}\right).$$

The weighting coefficients $\alpha_i$ may be obtained such that $s_c(t)$ is periodic with a period of NT/2 when N is even and with a period of 2NT when N is odd. When N is odd, $s_c(t)$ cannot be made periodic with period NT/2, because the weighted coefficients are constrained to be real. However, $\alpha_i$ may be chosen such that $s_c(t)$ is structured in an interval 2NT.

Figure 7:
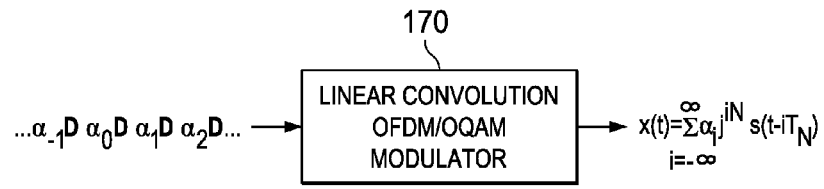
FIG. 7 illustrates an embodiment weighted circularly convolved OFDM/OQAM modulator.

FIG. 7 illustrates weighted circularly convolved filtering, which may be applied to OFDM/OQAM. An input data burst D is multiplied by coefficients $\alpha_i$ and shifted to produce . . . $\alpha_{-1}D$ $\alpha_0 D$ $\alpha_1 D$ $\alpha_2 D$ . . . . The $\alpha_i$ factors are real coefficients that are chosen so x(t) is periodic or structured. Theoretically, there are infinite $\alpha_i$ factors, but in practice a finite number of $\alpha_i$ factors are used. The multiplied and shifted waveform is then linearly convolved by linear convolution OFDM/OQAM modulator 170. Thus, an output produced is:

$$x(t) = \sum_{i=-\infty}^{\infty} \alpha_i j^{iN} s(t-iT_N),$$

where $T_N \triangleq NT/2$. This output x(t) is ready for transmission.

Figure 8:
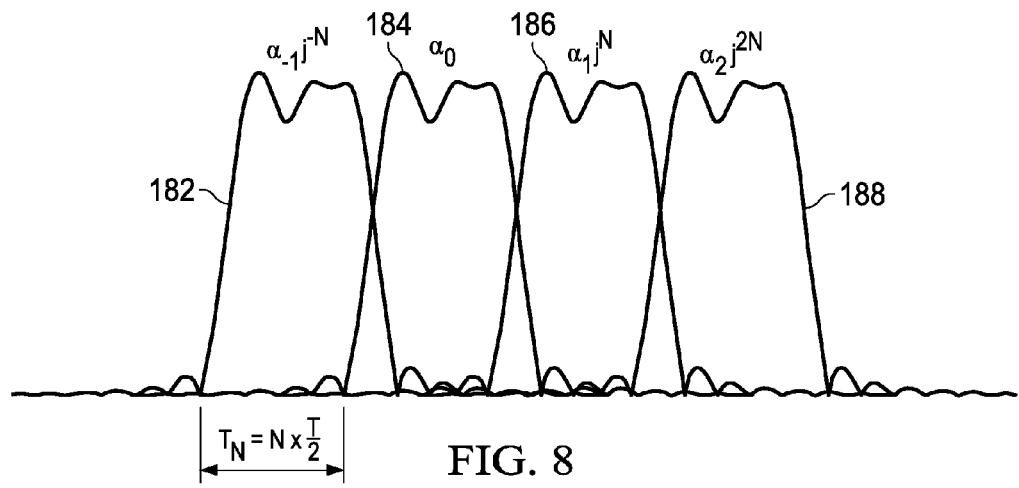
FIG. 8 illustrates weighted circularly convolved OFDM/OQAM modulation.

FIG. 8 illustrates an example of the generation of x(t). The transmission is periodic with a length of $T_N$. Four shifted curves, curve 182, curve 184, curve 186, and curve 188 are added together. Curve 182 is generated by factor $\alpha_{-1} j^{-N}$, curve 184 is generated by factor $\alpha_0$, curve 186 is generated by factor $\alpha_1 j^N$, and curve 188 is generated by factor $\alpha_2 j^{2N}$. When only the periodic portion $T_N$ is transmitted, the original signal may be reconstructed based on this periodicity.

When N is even, a periodic x(t) with period $T_N$ may be achieved. When N modulo 4 is equal to 0, $\alpha_i=1$, and when N modulo 4 equals 2, $\alpha_i=(-1)^i$. In both cases, the waveform is periodic with a period of:

$$T_N = N \times \frac{T}{2}.$$

Thus:

$$x(t+T_N) = x(t),$$

and:

$$x_{even}(t) = \sum_{i=-\infty}^{+\infty} s(t - iT_N).$$

Figure 9:
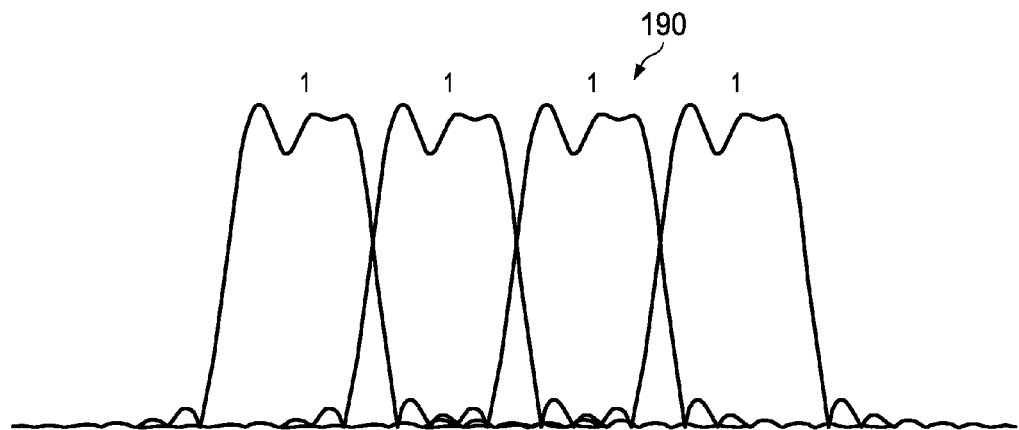
FIG. 9 illustrates weighted circularly convolved OFDM/OQAM modulation.

FIG. 9 illustrates an example waveform structure 190 where the waveform is periodic with period TN/2, and N is even.

Figure 10:
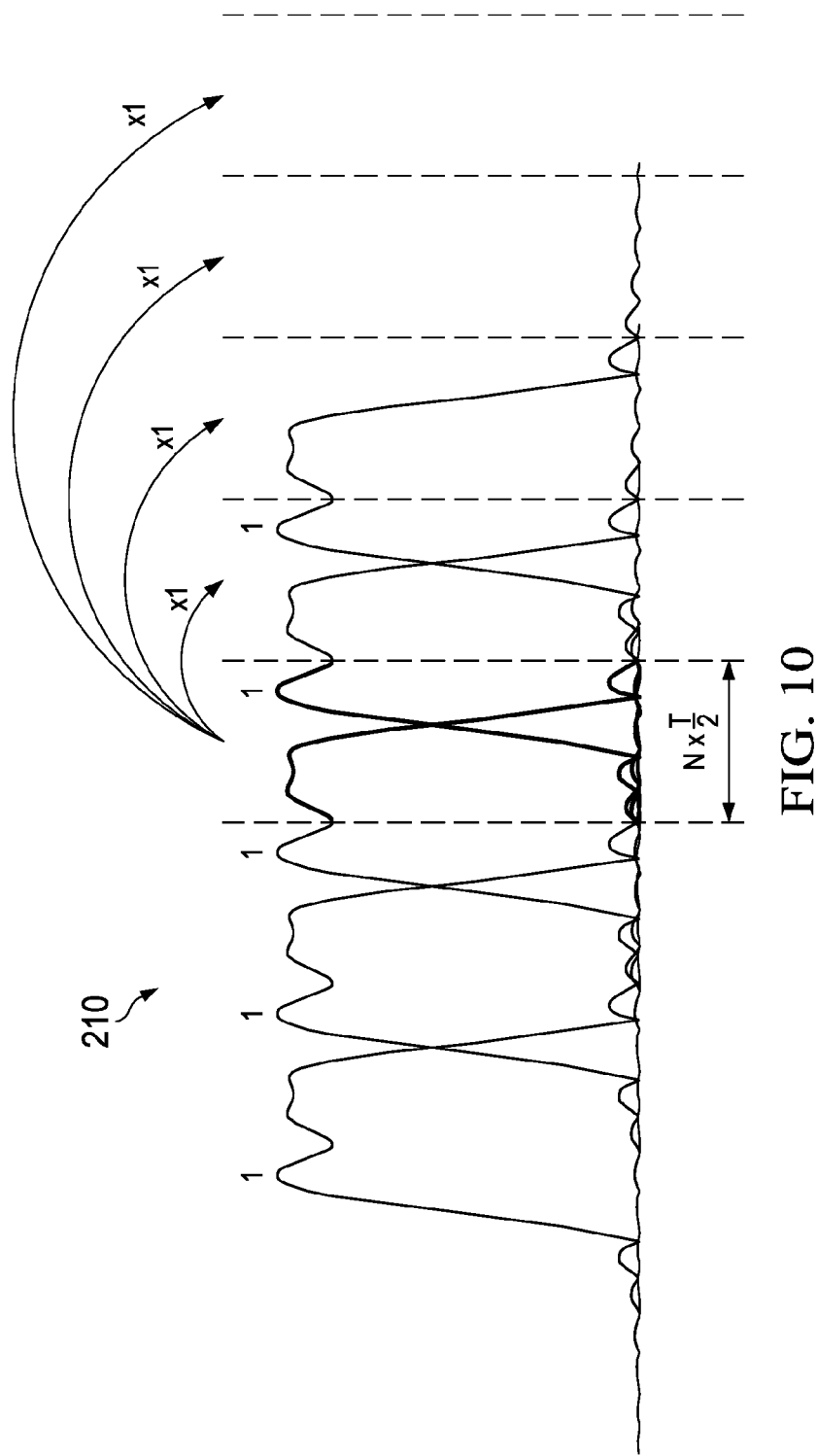
FIG. 10 illustrates weighted circularly convolved OFDM/OQAM modulation.

FIG. 10 illustrates implementation 210 for modulation when N is even. The original waveform is shifted and added four times, as in FIG. 9. The resulting waveform is then cropped. For a large N, for example N≥2L−1 when length of the prototype filter is LT, two iterations are performed. For a small N, for example N<2L−1, more than two iterations may be performed.

Figure 11:
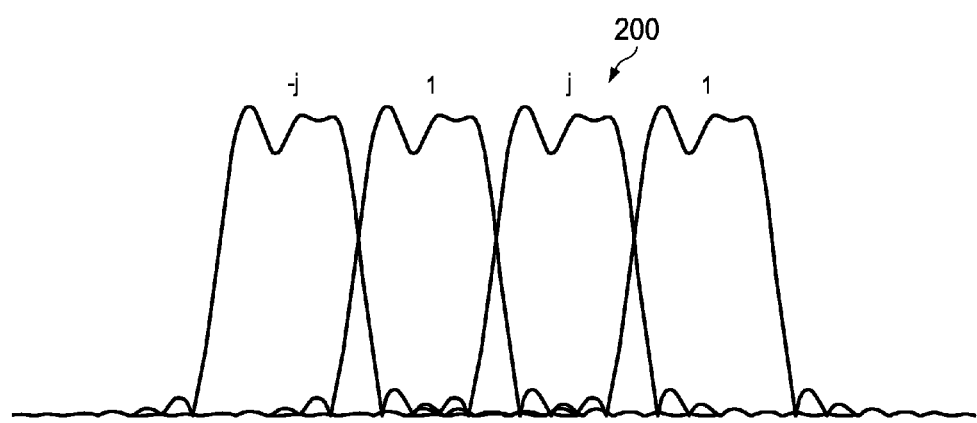
FIG. 11 illustrates weighted circularly convolved OFDM/OQAM modulation.

When N is odd, the multiplication factors can be selected so that the waveform has a special structure. The structure has a period of 4 $T_N$. However, because of the structure, the entire waveform may be recovered from a time interval of NT/2. When N modulo 4 equals 1, $\alpha_i=1$, and when N modulo 4 equals 3, $\alpha_i=(-1)^i$. FIG. 11 illustrates waveform structure 200, where:

$$x_{odd}(t) = \sum_{i=-\infty}^{+\infty} s(t - 4iT_N) + \sum_{i=-\infty}^{+\infty} j \times s(t - 4iT_N - T_N) +$$
$$\sum_{i=-\infty}^{+\infty} (-1) \times s(t - 4iT_N - 2T_N) + \sum_{i=-\infty}^{+\infty} (-j) \times s(t - 4iT_N - 3T_N),$$

which is a periodic signal with a period of 2NT.

It can be shown that;

$$x_{odd}(t+T_N) = j \times x_{odd}(t)$$

$$x_{odd}(t+2T_N) = (-1) \times x_{odd}(t),$$

$$x_{odd}(t+3T_N) = (-j) \times x_{odd}(t), \text{ and}$$

$$x_{odd}(t+4T_N) = x_{odd}(t).$$

From this structure, the original waveform may be recovered from an interval $T_N$. In an example, the proof of the first equation above is as follows:

$$j \times x_{odd}(t) = \sum_{i=-\infty}^{+\infty} j \times s(t - 4iT_N) + \sum_{i=-\infty}^{+\infty} (-1) \times s(t - 4iT_N - T_N) +$$
$$\sum_{i=-\infty}^{+\infty} (-j) \times s(t - 4iT_N - 2T_N) + \sum_{i=-\infty}^{+\infty} s(t - 4iT_N - 3T_N).$$

This is equal to:

$$j \times x_{odd}(t) = \sum_{i=-\infty}^{+\infty} s(t + T_N - 4(i+1)T_N) +$$
$$\sum_{i=-\infty}^{+\infty} j \times s(t + T_N - 4iT_N - T_N) + \sum_{i=-\infty}^{+\infty} (-1) \times s(t + T_N - 4iT_N - 2T_N) +$$
$$\sum_{i=-\infty}^{+\infty} (-j) \times s(t + T_N - 4iT_N - 3T_N).$$

Thus:

$$j \times x_{odd}(t) = x_{odd}(t+T_N).$$

Figure 12:
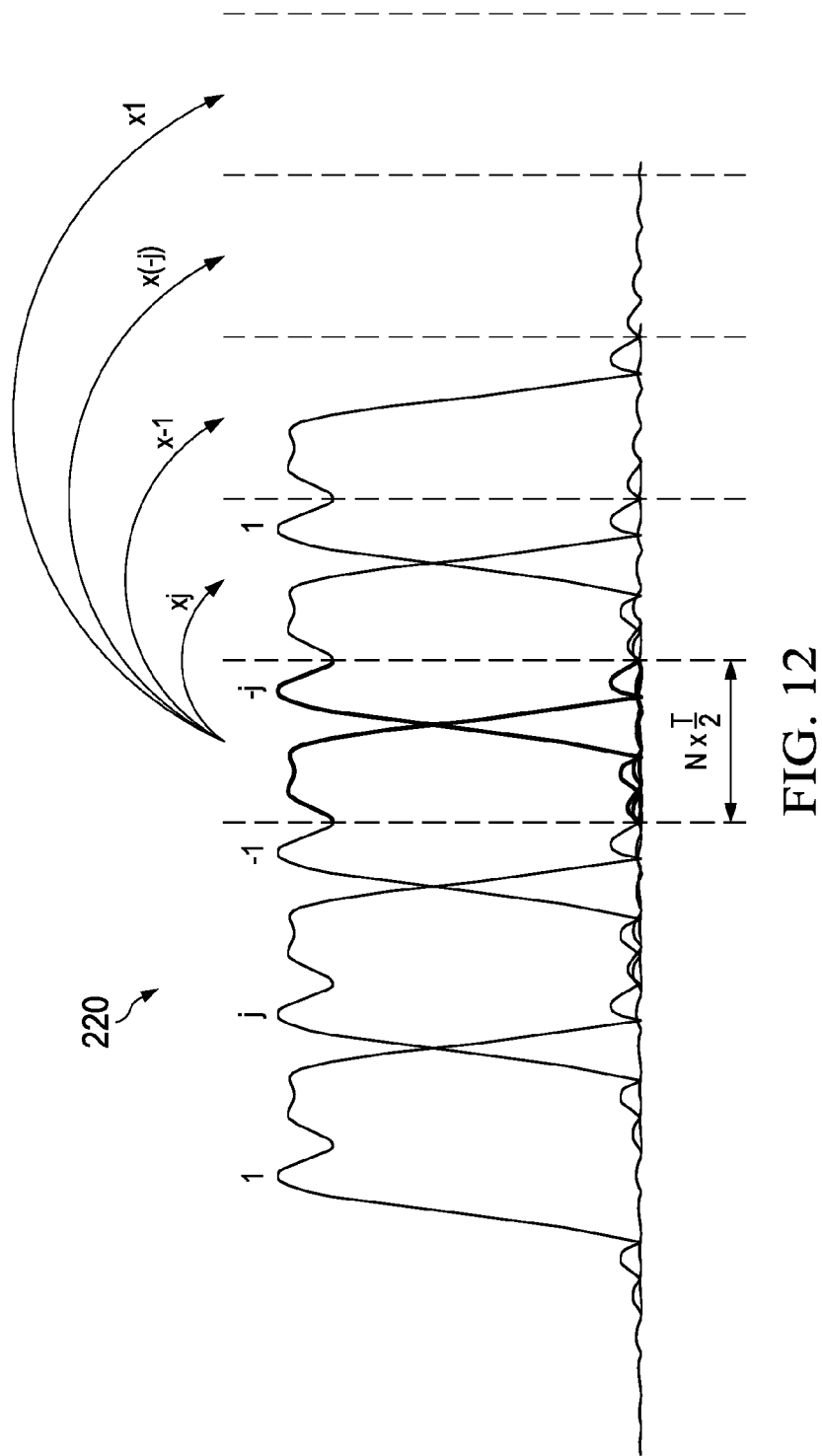
FIG. 12 illustrates weighted circularly convolved OFDM/OQAM modulation.

FIG. 12 illustrates implementation 220 for modulation when N is odd. Waveforms are shifted and multiplied by 1, j, −1, and −j. A portion NT/2 is retained for transmission.

Figure 13:
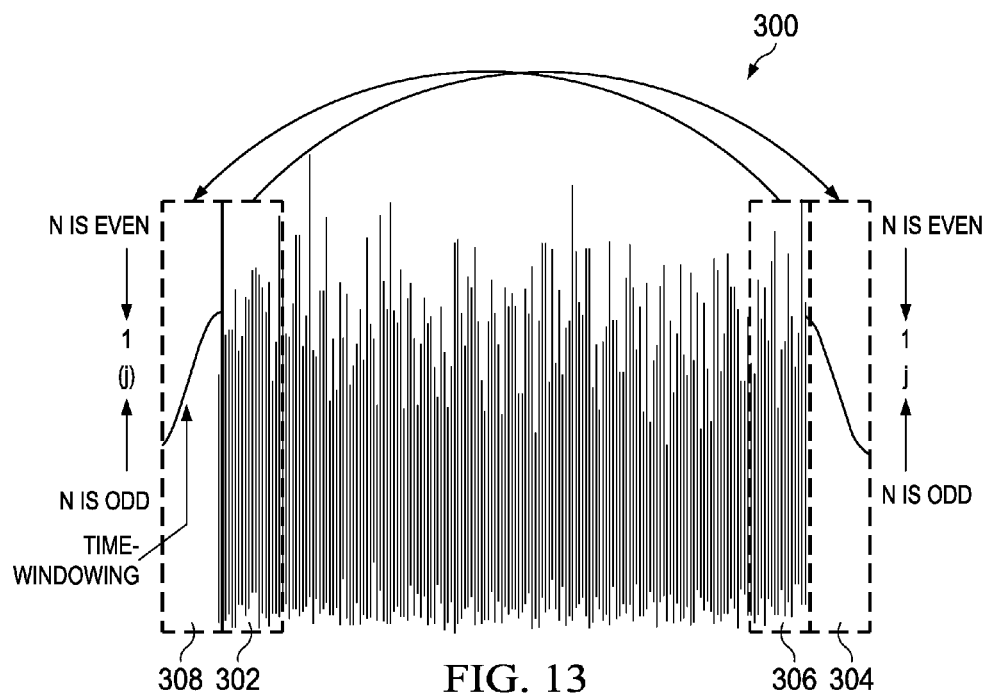
FIG. 13 illustrates weighted time windowing.

Due to sharp signal edges in the time domain, weighted circularly convolved OFDM/OQAM has an inferior spectrum side-lobe performance compared to linearly convolved OFDM/OQAM. Weighted time domain windowing may be used to smooth transitions on the edges of the signal. Because the time windowing is performed by appending two smoothly transitioned windows to the beginning and end of the weighted circularly convolved OFDM/OQAM signal, it does not cause distortion to the signal. FIG. 13 illustrates graph 300 demonstrating weighted time domain windowing.

When N is even, a portion of length $0.5T_w$ from the beginning of signal 302 is Appended to its end 304. Similarly, a portion of length $0.5T_w$ from the end from the signal 306 is appended to its beginning 308. This ensures continuity of the signal on its edges. Then, an appropriate rolling-off window of length $T_w$, for example a raised cosine window, is applied to the appended portions at the beginning and end of the signal.

When N is odd, a portion of length $0.5T_w$ from the beginning from the signal 302 is first multiplied by j, and then appended to its end 304. Also, a portion of length $0.5T_w$ from the end from the signal 306 is first multiplied by −j, and then appended to its beginning 308. Then, windowing is applied to the signal.

Figure 14:
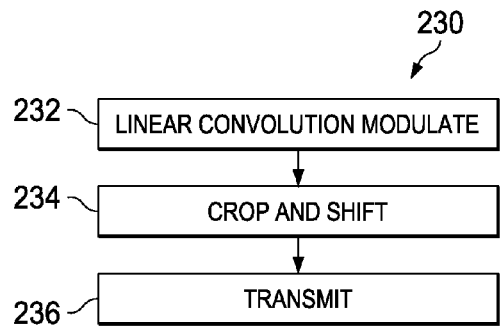
FIG. 14 illustrates a flowchart of an embodiment method of weighted circularly convolved OFDM/OQAM modulation.

FIG. 14 illustrates flowchart 230 for a method of performing OFDM/OQAM modulation. Initially, in step 232, linear convolution modulation is performed. For example, linear convolution modulation may be performed as illustrated by OFDM/OQAM modulator poly-phase structure 110 in FIG. 5.

Next, in step 234, cropping and shifting is performed on the linear convolution modulated output. Through waveform shifting and adding, a periodic or structured waveform is created. That waveform may then be cropped to a smaller portion for transmission. The original waveform may be recovered from the cropped waveform because of the periodicity or structuring of the waveform before cropping. If the prototype filter duration is LT, s(t) has a duration:

$$\frac{(N-1)T}{2} + LT.$$

Then:

$$i_{max} \triangleq \left\lceil \frac{\frac{(N-1)T}{2} + LT}{\frac{NT}{2}} \right\rceil = \left\lceil \frac{N + 2L - 1}{N} \right\rceil,$$

Where ⌈x⌉ is the smallest integer≥x. The overhead-removed signal is obtained from s(t). When N is even:

$$s_{out}(t) = \sum_{i=0}^{i_{max}-1} s\left(t + \frac{iNT}{2}\right)$$

for:

$$0 \le t \le \frac{NT}{2}.$$

When N is odd:

$$s_{out}(t) = \sum_{i=0}^{i_{max}-1} (-j)^i \cdot s\left(t + \frac{iNT}{2}\right)$$

for:

$$0 \le t \le \frac{NT}{2}.$$

Finally, in step 236, the cropped waveform is transmitted. In one example, the waveform is transmitted by a communications controller to a UE. In another example, the waveform is transmitted from a UE to a communications controller.

Figure 15:
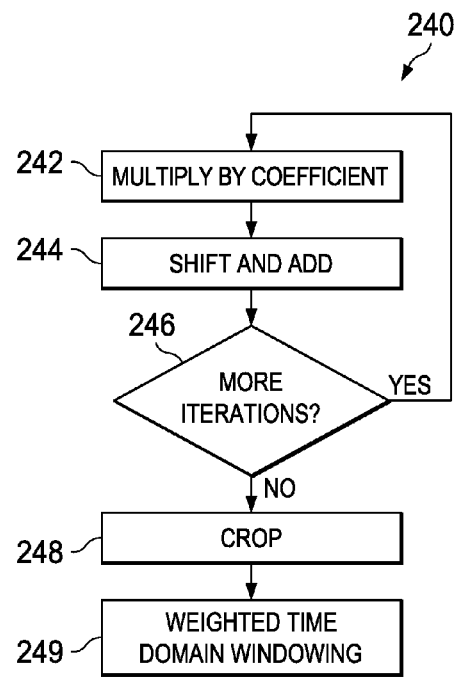
FIG. 15 illustrates a flowchart of an embodiment method of performing cropping and shifting.

FIG. 15 illustrates flowchart 240 for a method of performing cropping and shifting. Initially, in step 242, the waveform is multiplied by a coefficient $\alpha_i$.

Then, in step 244, the waveform is shifted by i and added to the original waveform.

Next, in step 246, the device determines whether there are more iterations. When there are more iterations, it proceeds to step 242 to add and shift the waveform again. When there are no more iterations, it proceeds to step 248, where the waveform is cropped. The cropped waveform contains sufficient information for the original waveform to be recovered.

In step 249, weighted time domain windowing may be performed. Weighted time domain windowing causes the transmission time to go to zero smoothly. Some time is added and weighted time domain windowing is used. However, the added time is a relatively small amount of time.

Figure 16:
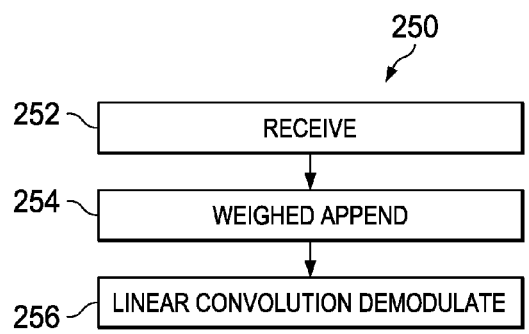
FIG. 16 illustrates a flowchart of an embodiment method of weighted circularly convolved OFDM/OQAM demodulation.

FIG. 16 illustrates flowchart 250 for a method of OFDM/OQAM demodulation, where circularly convolved filtering is used. Initially, in step 252, a message that had been modulated using circularly convolved filtering is received. In one example, a UE receives a message from a communications controller. In another example, a communications controller receives a message from a UE.

Next, in step 254, weighted appending is applied to the waveform. When N is even, the original signal can be reconstructed by modulo NT/2 circularizing the receiver. The signal duration is:

$$\frac{(N-1)T}{2} + LT.$$

When N is even:

$$s_{in}(t) = [s_{out}(t)|s_{out}(t)| \ldots |s_{out}(t)]$$

for $i_{max}$ times.
When N is odd:

$$s_{in}(t) = [s_{out}(t)|js_{out}(t)|-s_{out}(t)|-js_{out}(t)| \ldots ]$$

for $i_{max}$ times. Also, weighted time domain windowing may be removed.

Linear convolution demodulation is performed in step 256. This may be done, for example, using OFDM/OQAM demodulator poly-phase structure 150 illustrated in FIG. 6. $\hat{d}_c(n)$ can be obtained by passing the resulting signal through the demodulator. In an ideal noiseless channel, $(n) = \hat{d}_c(n) = d_c(n) = d(n)$ for $n = 0, \ldots, N-1$, due to the real-orthogonality of OFDM/OQAM.

Figure 17:
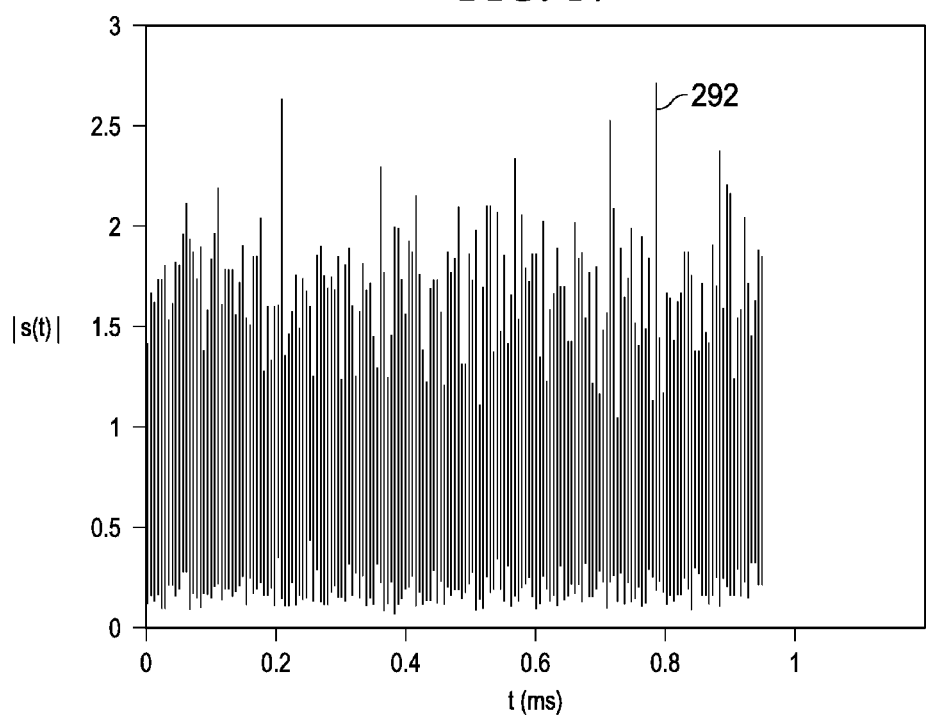
FIG. 17 illustrates an OFDM/OQAM signal after weighted circular convolution.

FIG. 17 illustrates a graph of the overhead removed version of a signal versus time using the weighted circularly convolved OFDM/OQAM, shown by curve 292.

In another example, the poly-phase filters in the OFDM/OQAM modulator and demodulator are replaced with modulo-N weighted circular convolution filters. The time shifts are replaced with modulo-N M weighted circular time shifts.

Figure 18:
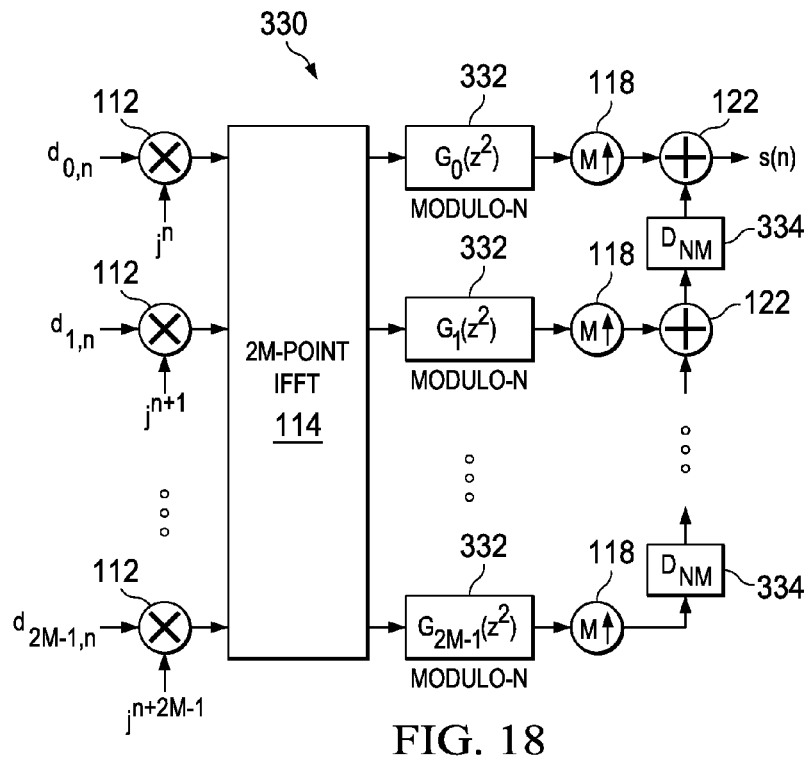
FIG. 18 illustrates another embodiment OFDM/OQAM modulator poly-phase structure.

FIG. 18 illustrates OFDM/OQAM modulator poly-phase structure 330 which may be used for OFDM/OQAM circularly convolved modulation. The inputs $d_{k,n}$, where k represents the subcarrier and n represents the symbol in time. The inputs are multiplied by $j^{n+k}$ in multiplier blocks 112. Then, IFFT block 114 performs IFFT on the multiplied values. After IFFT block 114, modulo-N filters 332 perform weighted circular convolution with the transfer functions $G_k(z^2)$. The input of a modulo-N filter is x(n), and the output is y(n). When N is even:

$$y(n) = \begin{cases} \sum_{m=-\infty}^{+\infty} h(m) \sum_{i=-\infty}^{+\infty} x(n-m-iN), & 0 \le n \le N-1 \\ 0, & \text{otherwise} \end{cases}.$$

When N is odd:

$$y(n) = \begin{cases} \sum_{m=-\infty}^{+\infty} h(m) \sum_{i=-\infty}^{+\infty} j^i \cdot x(n-m-iN), & 0 \le n \le N-1 \\ 0, & \text{otherwise} \end{cases}.$$

Expansion blocks 118 expand the filtered waveforms by a factor M. The outputs are time shifted by modulo-M N time shift blocks 334 $D_{MN}$, and added by adders 122. The input for modulo-M N time shift blocks 334 is a(n), and the output is b(n). When N is even:

$$b(n) = \begin{cases} a(NM), & n = 0 \\ a(n-1), & 1 \le n \le NM - 1 \\ 0, & \text{otherwise} \end{cases}.$$

When N is even:

$$b(n) = \begin{cases} -j \cdot a(NM), & n = 0 \\ a(n-1), & 1 \le n \le NM - 1 \\ 0, & \text{otherwise} \end{cases}.$$

Figure 19:
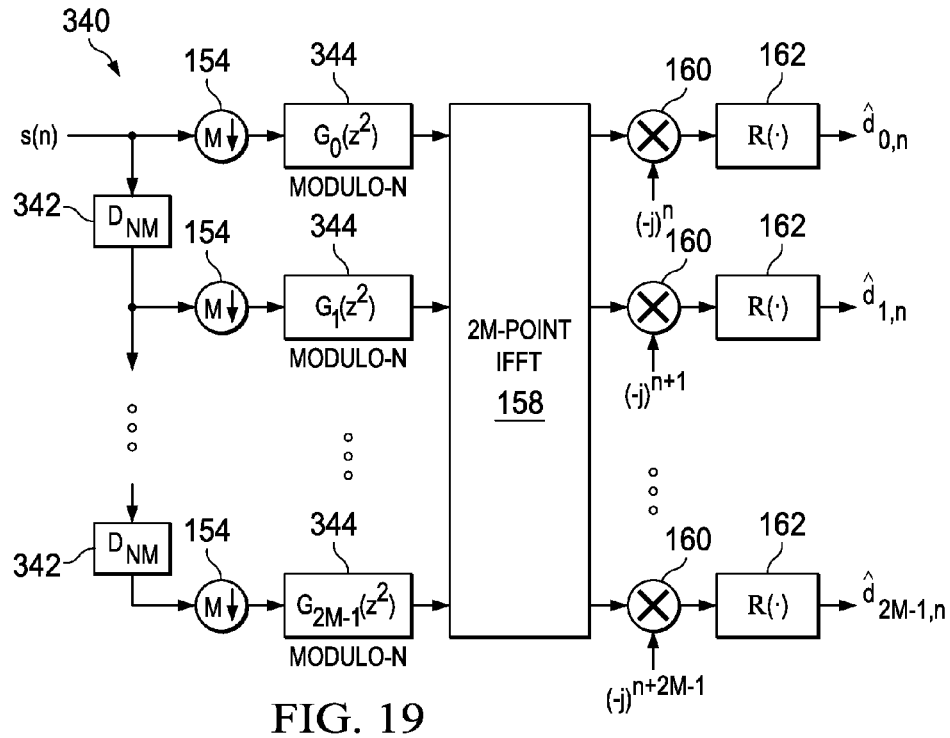
FIG. 19 illustrates another embodiment OFDM/OQAM demodulator poly-phase structure.

FIG. 19 illustrates OFDM/OQAM demodulator poly-phase structure 340, which is used for OFDM/OQAM demodulation with circularly convolved modulation. The received signal s(n) is time shifted by modulo-N M time shift block 342 D. Then, the time shifted signal is decimated by decimator blocks 154. Filter blocks 344 filter the decimated output using $G_k(z^2)$. Next, a 2M-point IFFT is performed by IFFT block 158. The outputs are then multiplied by $(-j)^{n+k}$ in multiplication blocks 160. Finally the real parts are extracted by real extractor blocks 162.

Figure 20:
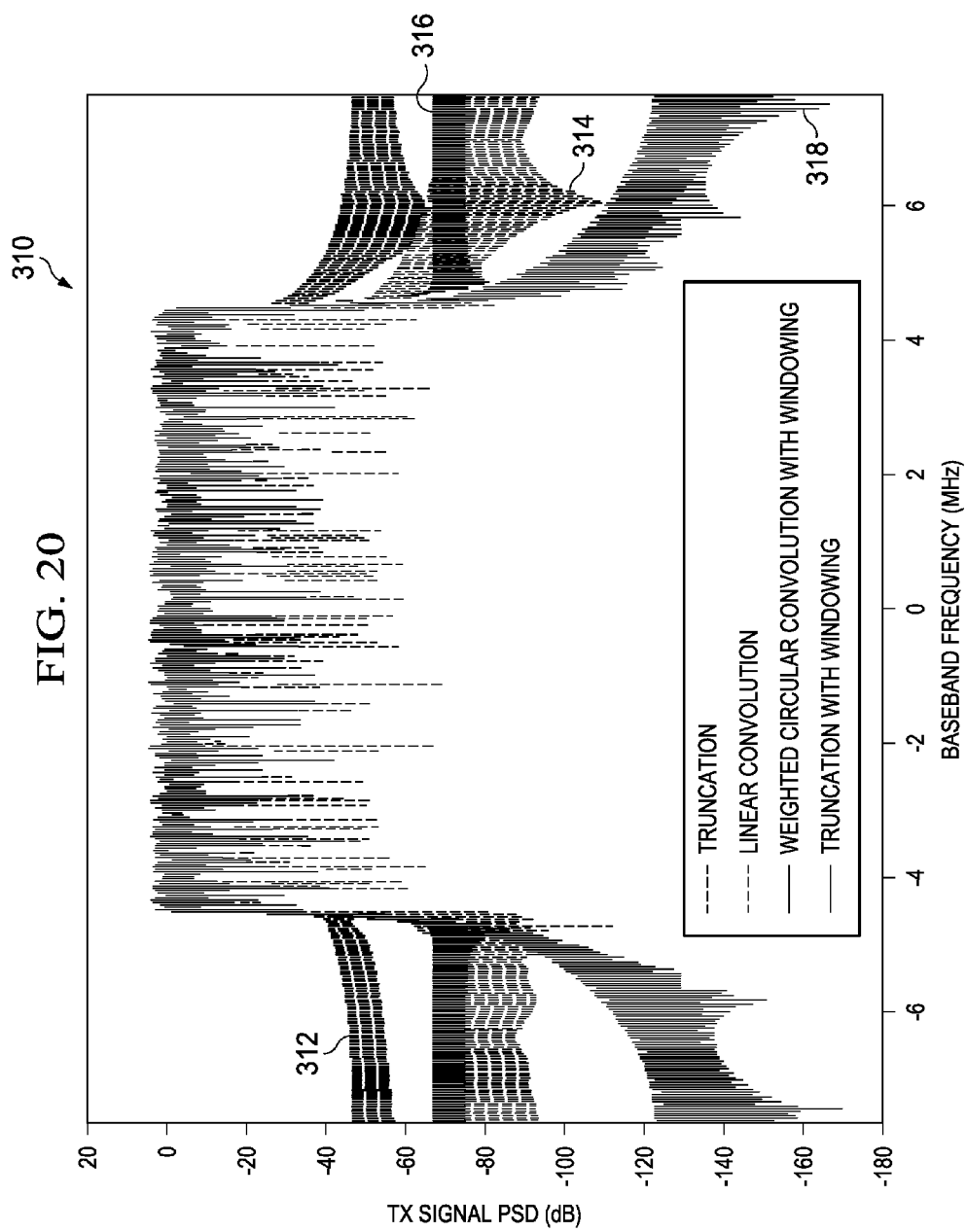
FIG. 20 illustrates a graph of power spectral density (PSD) versus baseband frequency.
Figure 21:
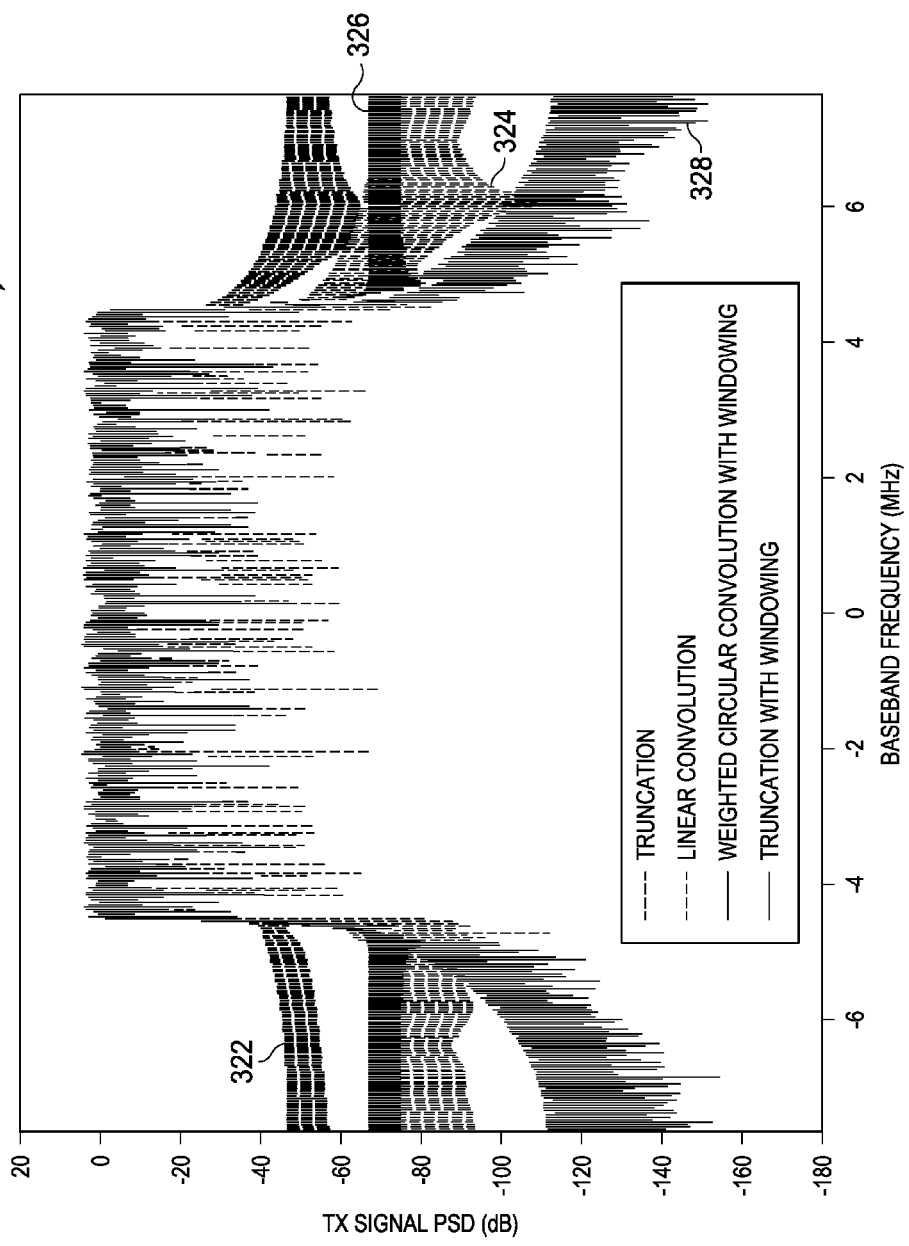
FIG. 21 illustrates another graph of PSD versus baseband frequency.

FIGS. 20 and 21 illustrate graphs of power spectral density (PSD) in decibels (dB) versus the baseband frequency in MHz. Two OQAM symbols are used to generate these graphs to evaluate the performance of weighted circularly convolved OFDM/OQAM modulation for edge symbols. 600 subcarriers with a subcarrier spacing of 15 kHz are used, which is the equivalent to OQAM symbols of duration T of approximately 66.67 μs. The prototype filter used is root-raised-cosine of length 4T with roll-off factor of β=1. For time-windowing, a windowing length of $T_w=T/2$ is used for graph 310 of FIG. 20 while a windowing length of $T_w=T/4$ is used for graph 320 in FIG. 21. Both graphs compare the PSD of time-domain windowed weighted circularly convolved OFDM/OQAM signals with those of linearly convolved OFDM/OQAM signals both with and without truncation. For truncation, a portion of length:

$$\frac{NT}{2} + T_w = T + T_w$$

from the middle of the signal is retained, and the rest is truncated. $T_w$ windowing is applied to the truncated signal. This windowing improves the spectrum side-lobe performance of the truncated signal at the expense of signal distortion.

FIG. 20 illustrates graph 310 for windowing length of $T_w=T/2$. Curve 312 (denoted by a dashed line) shows the PSD with truncation, curve 314 (denoted by a separate dashed line) shows the PSD with linear convolution, curve 316 (denoted by a solid line) shows the PSD with weighted circular convolution with windowing, and curve 318 (denoted by a separate solid line) shows the PSD with truncation and windowing. The error vector magnitude (EVM) of the demodulated OQAM constellation points is calculated for these four curves. For linear convolution, the EVM is −69.47 dB, for circular convolution with windowing, the EVM is −43.83 dB, for truncation, the EVM is −30.77, and for truncation with windowing, the EVM is −21.46 dB.

FIG. 21 illustrates graph 320 for windowing length of $T_w=T/4$. Curve 322 (denoted by a dashed line) shows the PSD for truncation, curve 324 (denoted by a separate dashed line) shows the PSD for linear convolution, curve 326 (denoted by a solid line) shows the curve for PSD with weighted circular convolution with windowing, and curve 328 (denoted by a separate solid line) shows the PSD for truncation with windowing. The EVM of the demodulated OQAM constellation points is calculated for these curves. For linear convolution, the EVM is −69.47 dB, for circular convolution with windowing, the EVM is −43.83 dB, for truncation, the EVM is −20.16 dB, and for truncation with windowing, the EVM is −17.11 dB.

For both graphs, the PSD of the windowed weighted circularly convolved signal is very close to that of the linearly convolved one, and is superior in proximity to the main lobe. The inferior side lobe performance of the linearly convolved signal and its inferior performance compared to truncation with windowing is due to the truncation of the prototype filter, which gives rise to the side lobes. Increasing the prototype filter length may improve the side lobe performance.

Figure 22:
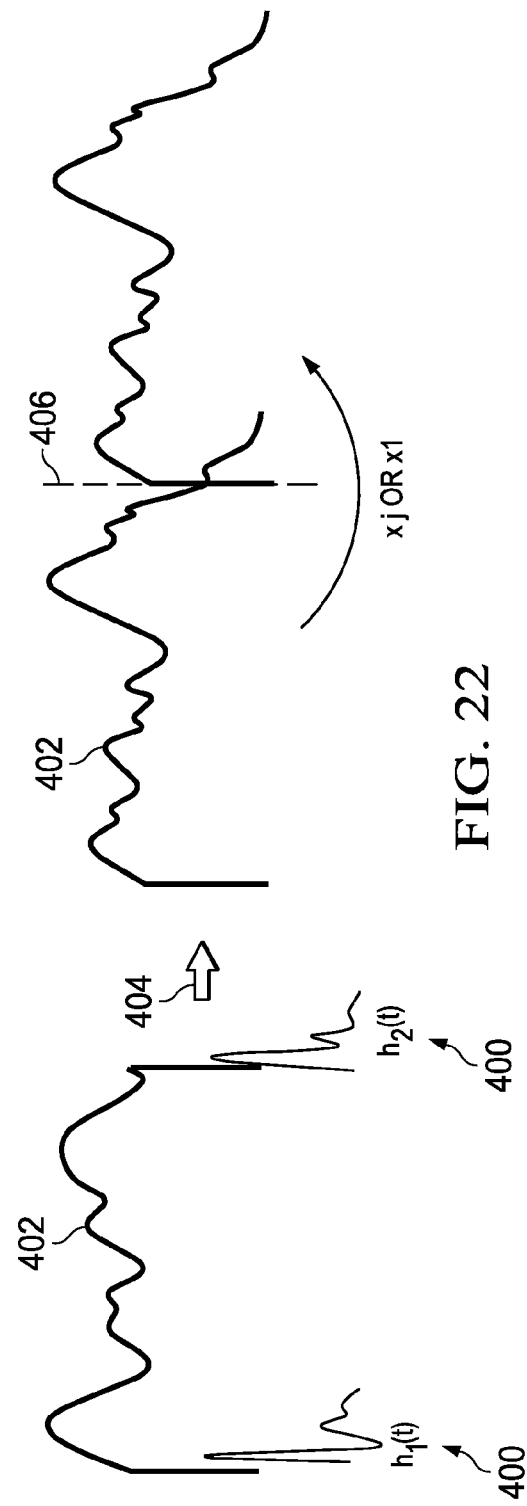
FIG. 22 illustrates a transmission burst sent over a time-varying channel.

One potential concern regarding the performance of weighted circularly convolved OFDM/OQAM modulation relates to high mobility UEs. High mobility UEs are UEs that are sufficiently mobile to have a time-varying transmission channel over a transmission burst. Due to the change in transmission channel, after the weighted appending at receiver (e.g., step 254 of FIG. 16), a channel discontinuity may manifest at the edge of the transmission burst of a high-mobility UE. For example, FIG. 22 illustrates a weighted circularly convolved OFDM/OQAM modulated transmission burst 402 transmitted over a time-varying transmission channel 400 of a high-mobility UE. At the receiver, after the weighted appending of transmission burst 402 (represented by arrow 404), a discontinuity 406 manifests at edges of transmission burst 402 due to time-varying transmission channel 400. Discontinuity 406 may lead to ISI/ICI on OQAM symbols at edges of the transmission block. The ISI/ICI on OQAM symbols at edge locations may be especially problematic for high mobility UEs in a high signal to noise ratio (SNR) communication regime because in low SNR regimes, additive white Gaussian noise (AWGN) may be more dominant than ISI/ICI.

Figure 23:
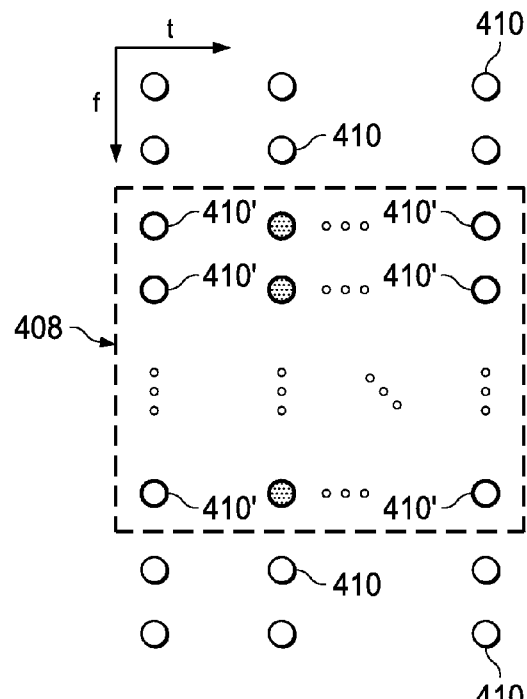
FIG. 23 illustrates reserving edge OQAM symbols of transmission blocks for high mobility UEs.

ISI/ICI at transmission block edges for high mobility UEs may be resolved by reserving the symbols at transmission block edges as guard symbols. That is, nothing may be transmitted on OQAM symbols at both edges of the transmission block for high mobility UEs. FIG. 23 illustrates the implementation of guard symbols for a high mobility UE. A transmission block 408 for high mobility UEs includes a plurality of OQAM symbols 410 in the time-frequency domain. OQAM symbols at edges of transmission block 408 (i.e., OQAM symbols 410') are be reserved as guard symbols 410', and nothing is transmitted on symbols 410'. Thus, ISI/ICI on these edge locations may be avoided. Because guard symbols may only be reserved for high-mobility UEs, which are typically a small percentage of UEs in a network, the loss of spectral efficiency across the network may be very small or negligible. Furthermore, guard symbols may be transparent to and not impact other UEs that are not high mobility in the network. In various alternative embodiments, the implementation of guard symbols may only be applied to high mobility UEs in high SNR communication regimes.

The proposed overhead removal technique out-performs the truncation approach. The EVM difference between the proposed technique and the linearly convolved OFDM/OQAM signal is due to non-ideality of the prototype filter. Indeed, because the prototype filter is a truncated version of the root-raised-cosine filter, it is almost orthogonal. Hence, there exists a residual ISI/ICI even in the linearly convolved signal. Since the proposed overhead removal operation keeps a portion of the signal from the middle of an infinite length burst, it always experiences more residual ISI/ICI than the edge OQAM symbols of the linearly convolved signal. This residual interference may be mitigated by increasing the prototype filter length to make it more orthogonal.

Figure 24:
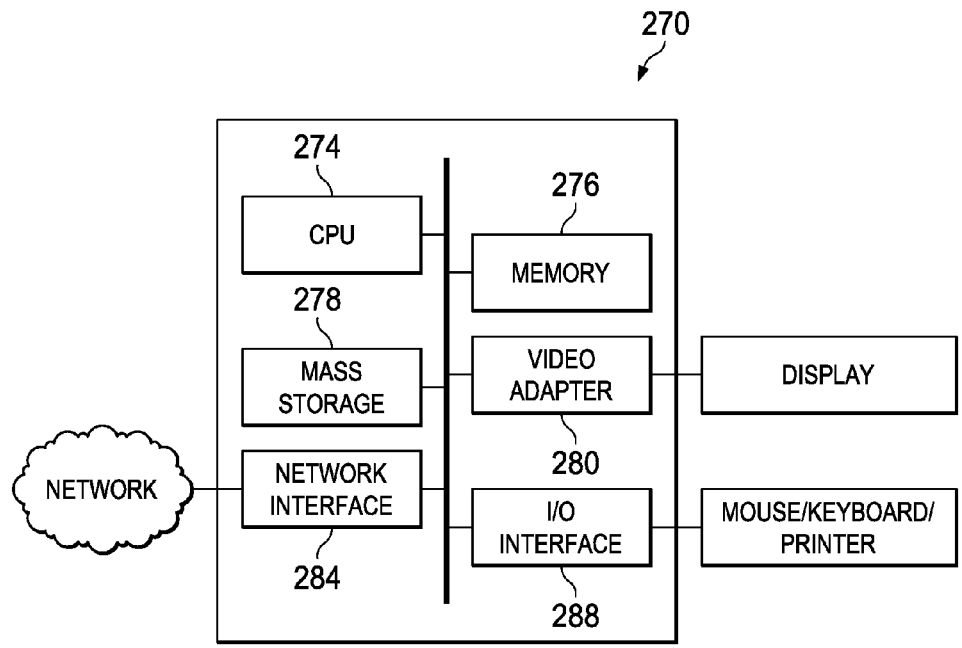
FIG. 24 illustrates a block diagram of an embodiment general-purpose computer system.

FIG. 24 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for performing orthogonal frequency division multiplexing (OFDM)/offset quantization amplitude modulation (OQAM), the method comprising:

obtaining a data burst;
performing weighted circularly convolved filtering modulation on the data burst comprising performing cropping and shifting to produce an output signal; and
transmitting, by a first wireless device to a second wireless device, the output signal.

2. The method of claim 1, wherein performing weighted circularly convolved filtering comprises:
performing linearly convolved filtering on the data burst to produce a linearly convolved signal, wherein performing cropping and shifting comprises;
performing cropping and shifting on the linearly convolved signal to produce the output signal.

3. The method of claim 2, wherein performing linearly convolved filtering comprises:
multiplying a plurality of components of the data burst by a plurality of multiplication factors to produce a plurality of multiplied factors;
performing inverse fast Fourier transform (IFFT) on the plurality of multiplied factors to produce a transformed signal comprising a plurality of transformed components;
filtering the plurality of transformed components to produce a plurality of filtered components;
expanding the plurality of filtered components to produce a plurality of expanded components;
shifting in time the plurality of filtered components to produce a plurality of time shifted components; and
summing the plurality of time shifted components to produce the linearly convolved signal.

4. The method of claim 1, wherein performing weighted circularly convolved filtering modulation comprises:
multiplying a plurality of components of the data burst by a plurality of multiplication factors to produce a plurality of multiplied factors;
performing inverse fast Fourier transform (IFFT) on the plurality of multiplied factors to produce a plurality of transformed components;
performing modulo-N weighted circular convolution on the plurality of transformed components to produce a plurality of filtered components;
expanding the plurality of filtered components to produce a plurality of expanded components;
delaying in time the filtered components by a plurality of modulo-N M weighted circular delays to produce a plurality of time shifted components; and
summing the plurality of time shifted components to produce the output signal.

5. The method of claim 1, wherein performing weighted circularly convolved filtering comprises:
multiplying a first waveform of the data burst by a two or more coefficients to produce a plurality of multiplied waveforms;
shifting in time each of the plurality of multiplied waveforms by a respective time offset to produce a plurality of time shifted waveforms, wherein the respective time offset is one of a plurality of time offsets; and
summing the plurality of time shifted waveforms to produce an added waveform.

6. The method of claim 5, wherein multiplying the first waveform of the data burst by a two or more coefficients to produce a plurality of multiplied waveforms comprises multiplying the first waveform by $i_{max}$ coefficients, wherein $i_{max}$ is an integer expressed by:

$$i_{max} \triangleq \left\lceil \frac{N+2L-1}{N} \right\rceil,$$

wherein the data burst has N OFDM/OQAM symbols, wherein N is an integer, and wherein a length of a prototype filter is LT.

7. The method of claim 5, further comprising cropping the added waveform to produce the output signal, wherein the data burst has N OFDM/OQAM symbols, wherein N is an integer, and wherein a time spacing between OFDM/OQAM symbols is T/2.

8. The method of claim 7, wherein cropping the added waveform comprises cropping the added waveform with a time interval of N times T/2.

9. The method of claim 7, wherein shifting in time each of the plurality of multiplied waveforms by a respective time offset comprises shifting a first one of the plurality of multiplied waveforms by NT/2, shifting a second one of the plurality of multiplied waveforms by NT, and shifting any additional multiplied waveforms of the plurality of multiplied waveforms by a previous time offset plus NT/2, wherein the previous time offset is a time offset applied to a multiplied waveform immediately prior to a respective additional multiplied waveform.

10. The method of claim 5, wherein the two or more coefficients are 1.

11. The method of claim 5, wherein the two or more coefficients alternate between 1, −j, −1, and j when N is odd.

12. The method of claim 1, wherein performing weighted circularly convolved filtering comprises performing weighted time domain windowing.

13. The method of claim 12, wherein performing weighted time domain windowing comprises:
producing an appended waveform having a first appended portion and a second appended portion by:
appending a beginning portion of a waveform of the data burst after an end portion of the waveform to produce a first appended portion; and
appending the end portion of the waveform before the beginning portion of the waveform to produce a second appended portion; and
multiplying the first appended portion by a rolling-off window and the second appended portion by the rolling-off window to produce the output signal.

14. The method of claim 13, wherein the rolling-off window is a raised-cosine window.

15. The method of claim 1, wherein the first wireless device is a communications controller, and wherein the second wireless device is a user equipment.

16. The method of claim 1, wherein the first wireless device is a user equipment, and wherein the second wireless device is a communications controller.

17. The method of claim 1, further comprising reserving OQAM symbols at both edges of a transmission block as guard symbols when the first wireless device or the second wireless device is a high mobility user equipment, wherein transmitting the output signal comprises transmitting the output signal on the transmission block.

18. The method of claim 17, wherein transmitting the output signal further comprises transmitting nothing on the guard symbols.

19. A method for performing orthogonal frequency division multiplexing (OFDM)/offset quantization amplitude modulation (OQAM), the method comprising:
receiving, by a first wireless device from a second wireless device, an input signal; and
performing weighted circularly convolved demodulation filtering on the input signal to produce a data burst, wherein performing weighted circularly convolved demodulation filtering comprises performing weighted appending to the input signal to produce an appended signal.

20. The method of claim 19, wherein performing weighted circularly convolved filtering demodulation on the data burst comprises:
performing linear convolution demodulation on the appended signal to produce the data burst.

21. The method of claim 20, wherein performing linear convolution demodulation comprises:
time shifting the appended signal to produce a plurality of time shifted signals;
downshifting the plurality of time shifted signals to produce a plurality of downshifted signals;
filtering the plurality of downshifted signals to produce a plurality of filtered signals;
performing inverse fast Fourier transform (IFFT) on the plurality of filtered signals to produce a plurality of transformed signals;
multiplying the plurality of transformed signals by a plurality of multiplication factors to produce a plurality of multiplied signals; and
extracting real portions of the plurality of multiplied signals.

22. The method of claim 19, wherein performing weighted circularly convolved filtering on the data burst comprises:
delaying the input signal with modulo-NM weighted circular delays to produce a plurality of time shifted signals;
downshifting the plurality of time shifted signals to produce a plurality of downshifted signals;
performing modulo-N weighted circular convolution on the plurality of downshifted signals to produce a plurality of filtered signals;
performing inverse fast Fourier transform (IFFT) on the plurality of filtered signals to produce a plurality of transformed signals;
multiplying the plurality of transformed signals by a plurality of multiplication factors to produce a plurality of multiplied signals; and
extracting real portions of the plurality of multiplied signals.

23. A first wireless device comprising:
a processor; and
a computer readable storage medium storing programming for execution by the processor, the programming including instructions to
obtain a data burst,
perform weighted circularly convolved filtering modulation on the data burst to produce an output signal, wherein the instructions to perform weighted circularly convolved filtering modulation comprise instructions to perform cropping and shifting to produce the output signal, and
transmit, to a second wireless device, the output signal.

* * * * *